US007340338B2

(12) United States Patent

Skala et al.

(10) Patent No.: US 7,340,338 B2
(45) Date of Patent: Mar. 4, 2008

(54) METHOD AND DEVICE FOR OPERATING AN INTERNAL COMBUSTION ENGINE

(75) Inventors: Peter Skala, Tamm (DE); Horst Wagner, Stuttgart (DE); Maik Schaufler, Hohenacker (DE)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 11/437,057

(22) Filed: May 18, 2006

(65) Prior Publication Data

US 2006/0282209 A1 Dec. 14, 2006

(30) Foreign Application Priority Data

May 18, 2005 (DE) ..................... 10 2005 022 690

(51) Int. Cl.
*G06F 17/00* (2006.01)
*G06F 19/00* (2006.01)

(52) U.S. Cl. ...................................... 701/103; 701/110

(58) Field of Classification Search ........ 701/101-105, 701/110, 111, 114, 115; 123/192.1, 198 F, 123/481

See application file for complete search history.

(56) References Cited

U.S. PATENT DOCUMENTS

| | | | | |
|---|---|---|---|---|
| 5,553,580 | A * | 9/1996 | Ganoung | 123/308 |
| 7,182,050 | B2 * | 2/2007 | Hitomi et al. | 123/58.8 |
| 7,246,594 | B2 * | 7/2007 | Hartmann | 123/198 F |
| 2006/0287803 | A1 * | 12/2006 | Skala et al. | 701/110 |

FOREIGN PATENT DOCUMENTS

| | | |
|---|---|---|
| DE | 196 11 839 | 10/1997 |
| DE | 100 16 649 | 6/2001 |

* cited by examiner

*Primary Examiner*—Willis R. Wolfe, Jr.
(74) *Attorney, Agent, or Firm*—Kenyon & Kenyon LLP

(57) ABSTRACT

A method and a device for operating an internal combustion engine, particularly of a vehicle, having several cylinder banks are provided, which allow for a simplified control. For this purpose, a resulting requirement is formed by coordinating several output variable requirements of the internal combustion engine. The coordination of the requirements for several cylinder banks is performed jointly, and the resulting output variable requirement is then divided into several individual output variable requirements of each particular cylinder bank.

12 Claims, 3 Drawing Sheets

METHOD AND DEVICE FOR OPERATING AN INTERNAL COMBUSTION ENGINE

FIELD OF THE INVENTION

The present invention starts out from a method and a device for operating an internal combustion engine.

FIELD OF THE INVENTION

Methods and devices for operating an internal combustion engine, particularly of a vehicle, having several cylinder banks are already known. It is also known to form a resulting torque requirement by coordinating several torque requirements of the internal combustion engine. For this purpose, the torque requirements of the internal combustion engine are coordinated separately for each cylinder bank.

SUMMARY OF THE INVENTION

By contrast, the method according to the present invention and the device according to the present invention have the advantage that the requirements are coordinated jointly for several cylinder banks and that the resulting output variable requirement is then divided into several individual output variable requirements of each particular cylinder bank. In this manner it is possible to reduce substantially the expenditure for coordinating the output variable requirements of the internal combustion engine when using multiple cylinder banks. Only a single such coordination of the output variable requirements of the internal combustion engine is then required for multiple cylinder banks.

It is particularly advantageous if one the requirements supplied to the coordination is formed by an average of the output variable losses of several cylinder banks. This makes it particularly simple and inexpensive to take into account different output variable losses of different cylinder banks even in a single coordination of the output variable requirements of the internal combustion engine for multiple cylinder banks.

The relevant advantage is also obtained if alternatively one of the requirements supplied to the coordination is formed by the output variable losses of the entire internal combustion engine.

Another advantage is obtained if a limiting value for the output variable of the internal combustion engine supplied to the coordination is formed by an average value of the upper or lower output variable limitations of several cylinder banks. Thus, even in the case in which a single coordination of the output variable requirements of the internal combustion engine is performed jointly for multiple cylinders, it is possible to implement a limitation of this output variable in a simple and inexpensive manner.

It is furthermore advantageous if the resulting output variable requirement of the internal combustion engine is divided into the individual output variable requirements of each particular cylinder bank as a function of cylinder bank-specific output variable limitations. In this manner it is possible to prevent an individual requirement from being placed on the output variable of at least one of the cylinder banks which exceeds or falls below the cylinder bank-specific output variable limitation associated with this at least one cylinder bank. This protects the cylinder banks against excessive load or prevents an operation of the cylinder banks that is critical with regard to safety.

Another advantage is achieved if the resulting output variable requirement is smaller than or equal to the smallest upper output variable limitation of all cylinder banks or larger than or equal to the largest lower output variable limitation of all cylinder banks and if the resulting output variable requirement of the internal combustion engine is divided into equal individual output variable requirements of each particular cylinder bank. This makes it particularly simple to divide the output variable requirement of the internal combustion engine into the individual output variable requirements of each particular cylinder bank, it being additionally possible to prevent speed fluctuations connected with different individual output variable requirements of different cylinder banks.

Another advantage is achieved if the resulting output variable requirement is larger than the smallest upper output variable limitation of all cylinder banks or smaller than the largest lower output variable limitation of all cylinder banks and if the resulting output variable requirement of the internal combustion engine at least for two of the cylinder banks is divided into individual output variable requirements of different magnitudes of each particular cylinder bank. This will ensure that, even in a resulting output variable requirement of the internal combustion engine that is larger than the smallest upper output variable limitation of all cylinder banks or smaller than the largest lower output variable limitation of all cylinder banks, it is possible to maintain the output variable limitations of all cylinder banks and that it is possible at the same time to implement the resulting output variable requirement of the internal combustion engine.

Another advantage is obtained if the resulting output variable requirement of the internal combustion engine is divided into the individual output variable requirements of each particular cylinder bank in the sequence of the magnitude of the upper or lower output variable limitations of the cylinder banks, particularly beginning with that cylinder bank with which the smallest upper output variable limitation of all cylinder banks or with which the largest lower output variable limitation of all cylinder banks is associated. When maintaining the output variable limitations of the individual cylinder banks this makes it particularly easy to ensure that the resulting output value requirement of the internal combustion engine is indeed implemented.

This may be implemented in a particularly simple and inexpensive manner in that in a first step a current change value for the individual requirements is set to zero and a currently considered cylinder bank is selected whose upper output variable limitation is not undershot by any other cylinder bank or whose lower output variable limitation is not exceeded by any other cylinder bank; that in a second step the individual requirement of the currently considered cylinder bank is formed by a minimum selection from the upper output variable limitation associated with the currently considered cylinder bank and the resulting output variable requirement of the internal combustion engine plus the current change value for the individual requirements divided by the number of the individual requirements yet to be formed or by a maximum selection from the lower output variable limitation associated with the currently considered cylinder bank and the resulting output variable requirement of the internal combustion engine plus the current change value for the individual requirements divided by the number of the individual requirements yet to be formed; that in a third step a check is performed to determine whether a cylinder bank exists for which no individual requirement has as yet been formed; that in this case a new current change value for the individual requirements is formed as the sum of the previous current change value for the individual requirements and the resulting output variable requirement of the internal combustion engine minus the individual requirement of the currently considered cylinder bank or as the sum of the previous current change value for the individual requirements and the individual requirement of the currently considered cylinder bank minus the resulting output variable requirement of the internal combustion engine; that, as the new currently considered cylinder bank, a cylinder bank is selected having the same or, if such does not exist, having the one larger upper output variable limitation or a cylinder bank is selected having the same or, if such does not exist, having the one smaller lower output variable limitation and the second step is continued with this cylinder bank; and that otherwise the division of the resulting output variable requirement of the internal combustion engine into the individual output variable requirements of each particular cylinder bank is broken off.

DETAILED DESCRIPTION

Figure 1:
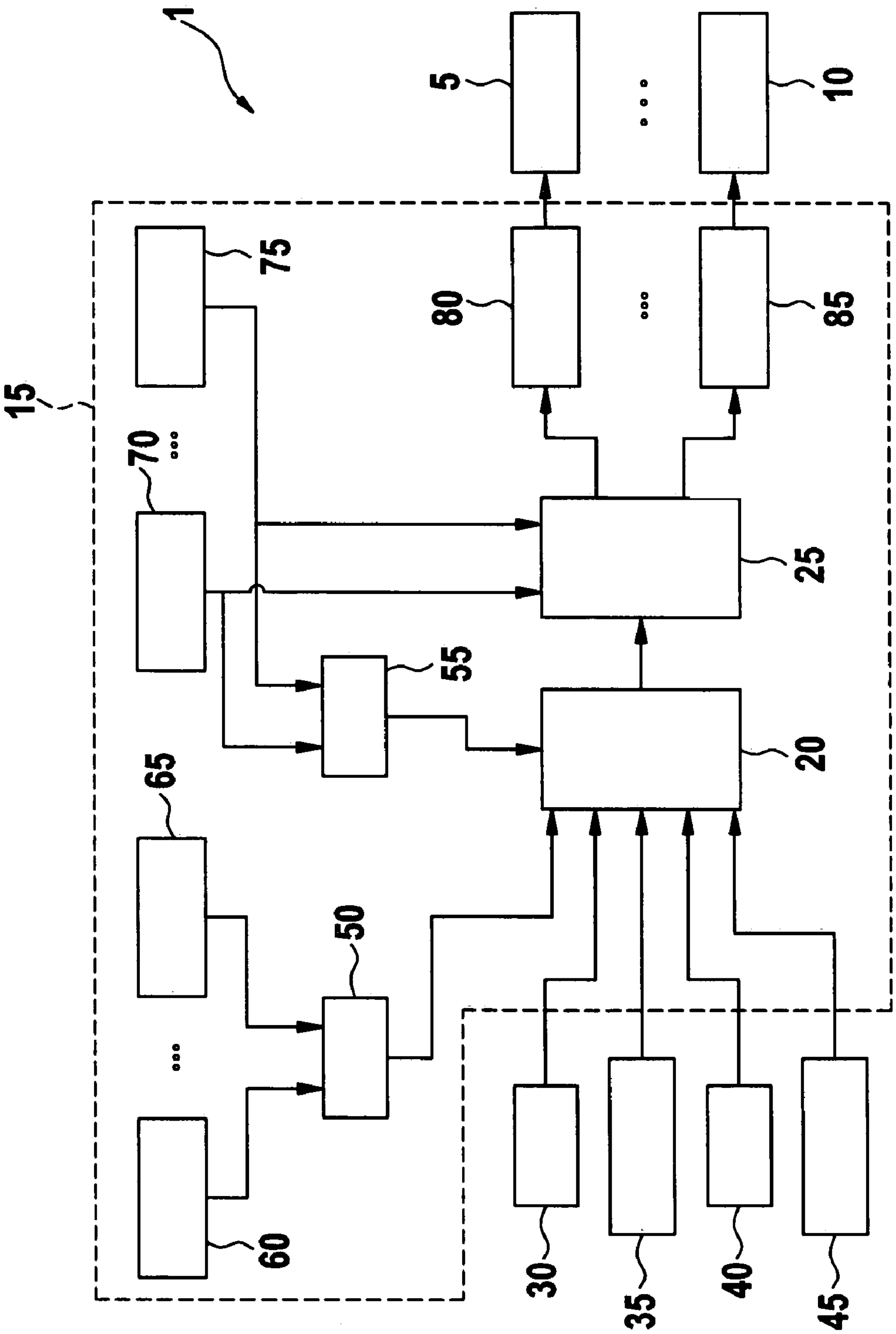
FIG. 1 shows a flow chart for controlling an internal combustion engine.

In FIG. 1, 1 designates an internal combustion engine, which drives a vehicle, for example. The internal combustion engine in this context may comprise a spark-ignition engine or a diesel engine. Internal combustion engine 1 comprises n cylinder banks, n being greater than one. FIG. 1 shows a first cylinder bank 5 and an nth cylinder bank 10. Internal combustion engine 1 is controlled by a control system 15, which may be implemented in terms of software and/or hardware, for example, in a control unit of the internal combustion engine. Control system 15 is represented in FIG. 1 in the form of a flow chart, which comprises the elements required for understanding the present invention and for the functioning of the present invention. The present invention provides for a coordinator 20, which forms a resulting requirement by coordinating several output variable requirements of internal combustion engine 1. A torque or power output or a value derived from the torque and/or the power output, for example, may be chosen as the output variable of the internal combustion engine. In the following, a torque is selected by way of example as the output variable of the internal combustion engine 1. For this purpose, the internal torque produced by internal combustion engine 1 is to be selected by way of example as the output variable of internal combustion engine 1. Different internal torque requirements of internal combustion engine 1 are supplied to coordinator 20. Four vehicle functions 30, 35, 40, 45 are provided in the example shown in FIG. 1, each of which is able to supply one internal torque requirement to coordinator 20, depending on whether or not these vehicle functions 30, 35, 40, 45 are active. Coordinator 20 coordinates the torque requirements supplied to it in a manner known to one skilled in the art for example from German Published Patent Application No.100 16 649 or German Published Patent Application No. 196 11 839 and forms at its output a resulting internal torque requirement. Thus vehicle functions 30, 35, 40, 45, as known from the related art, may be for example a function for ascertaining a driver-desired torque from an accelerator pedal position, a traction control, an idle speed control, a transmission control, an anti-lock braking system, a vehicle dynamics control, a vehicle speed control, a surge damping function, a load-reversal damping function etc. The example in FIG. 1 shows four vehicle functions that supply torque requirements to coordinator 20. More or fewer vehicle functions supplying torque requirements to coordinator 20 may also be provided, however. As known for example from German Published Patent Application No.196 11 839, the coordination of the torque requirements also takes into account torque losses of the internal combustion engine resulting for example from engine friction or from charge-exchange losses. In the case of connected loads or ancillary components such as air-conditioner compressors, car radio etc., the torque losses also comprise the torque requirements of these loads or ancillary components. Furthermore, in the coordination as known in an exemplary fashion from the documents German Published Patent Application No.100 16 649 and German Published Patent Application No. 196 11 839, torque limitations by predefined torque limiting values are also performed, these torque limiting values being formed, for example, for components protection reasons, exhaust-gas reasons etc. For this purpose, the described related art respectively describes an internal combustion engine in which no differentiation is made between different cylinder banks.

The present invention, however, provides for internal combustion engine 1 to be operated with n cylinder banks 5 to 10, it being possible for different cylinder banks to be operated variably depending on the operating state of internal combustion engine 1, i.e. to make different torque contributions to the total internal torque supplied by internal combustion engine 1. This in turn means that variably operated cylinder banks also have variable torque losses. A cylinder bank that is switched off, for example, has no charge-exchange losses in contrast to an activated cylinder bank. In order to take these different torque losses into account in the torque coordination, an average of the torque losses is supplied to coordinator 20, as shown in FIG. 1. For this purpose, the associated torque losses are ascertained for each cylinder bank in a manner known to one skilled in the art. Thus, as shown in FIG. 1, n torque loss ascertainment units 60 to 65 are provided. Each torque loss ascertainment unit 60 to 65 ascertains a total torque loss of the associated cylinder bank 5 to 10. The formed total torque losses of torque loss ascertainment units 60 to 65 are supplied to a first averaging unit 50 which forms for example an arithmetic average from these total torque losses and supplies this to coordinator 20 as a torque loss requirement.

Alternatively, the average of the total torque losses of cylinder banks 5 to 10 may also be ascertained by measuring the output variable losses of the entire internal combustion engine 1 in a manner known to one skilled in the art. This may be done, for example, by forming a time average of the internal torque loss of the entire internal combustion engine 1 over a suitable period of time, this period of time, for example, being suitably applied on a test stand in such a way that it corresponds to the maximum possible period duration of the speed fluctuations of internal combustion engine 1 caused by the multiple-bank operation. The term “torque loss” or “total torque loss” in the present exemplary embodiment always refers to the internal torque of the internal combustion engine or of the cylinder banks.

The variable operation of the existing cylinder banks 5 to 10 also entails that different limiting torques may result for different cylinder banks in the operation of the internal combustion engine, the term "limiting torques" here again having to be read with reference to the internal torque. Thus control unit 15 comprises n limiting torque ascertainment units 70 to 75, each of which is associated one-to-one with one of cylinder banks 5 to 10 in a corresponding manner as torque loss ascertainment units 60 to 65. Limiting torque ascertainment units 70 to 75 ascertain, in a manner known to one skilled in the art, for the respectively associated cylinder bank 5 to 10 an associated upper and/or lower limiting torque and pass this on to a second averaging unit 55. Second averaging unit 55 forms a first average for the upper limiting torques and/or a second average for the lower limiting torques and passes the average or averages on to coordinator 20. For this purpose, coordinator 20, as also explained in German Published Patent Application No.100 16 649, may comprise a coordinating element and a limiting element. The torque requirements of vehicle functions 30, 35, 40, 45 and the torque loss average are then supplied to the coordinating element, from which the coordinating element forms a coordinated setpoint value as an internal torque requirement in a manner known to one skilled in the art. This coordinated setpoint value is then subsequently limited by the limiting element of the coordinator 20 in the upward direction and/or in the downward direction with the aid of the upper average limiting torque and/or lower average limiting torque supplied by second averaging unit 55 such that a resulting and possibly limited torque requirement is obtained at the output of the limiting element. This resulting and possibly limited internal torque requirement is supplied to a division unit 25, which is additionally supplied with the upper and/or lower limiting torques of the individual cylinder banks 5 to 10 formed and supplied by limiting torque ascertainment units 70 to 75. Division unit 25 then divides the resulting internal torque requirement into several individual requirements placed on the internal torque to be generated by cylinder banks 5 to 10, each of the individual requirements being associated one-to-one with precisely one of cylinder banks 5 to 10. Thus, with n cylinder banks 5 to 10, precisely n individual internal torque requirements of each particular cylinder bank 5 to 10 are obtained, these n individual requirements being associated one-to-one with precisely one of the n cylinder banks 5 to 10. In the case of n=2 cylinder banks, the resulting internal torque requirement of the entire internal combustion engine 1 at the output of coordinator 20 is divided into a first individual internal torque requirement of a first cylinder bank 5 and a second individual internal torque requirement of a second cylinder bank 10. In the case of n=3 cylinder banks, the resulting internal torque requirement of the entire internal combustion engine 1 applied at the output of coordinator 20 is divided by division unit 25 into a first individual internal torque requirement of a first cylinder bank, into a second individual internal torque requirement of a second cylinder bank and a third individual internal torque requirement of a third cylinder bank. This may be implemented accordingly for an arbitrary number n of cylinder banks, n being greater than or equal to 2. Each cylinder bank 5 to 10 is assigned one implementation unit 80 to 85 in control unit 15, which is supplied with the individual internal torque requirement associated with the corresponding cylinder bank 5 to 10 from division unit 25 and which implements this individual requirement in the respective cylinder bank 5 to 10 in a manner known to one skilled in the art. In the case of spark-ignition engines, this implementation occurs by influencing the ignition angle, the air supply and/or the fuel supply, while in the case of diesel engine it occurs by influencing the air supply and/or the fuel supply.

The following describes in an exemplary manner how the division of the resulting inner torque requirement of the entire internal combustion engine 1 into the individual internal torque requirements of the individual cylinder banks 5 to 10 can be implemented. This division may occur, for example, as a function of the cylinder bank-specific limiting torques as they are ascertained in limiting torque ascertainment units 70 to 75 and supplied to division unit 25. In the following, an upper torque limitation shall be considered in an exemplary fashion, i.e. the upper limiting torques ascertained by limiting torque ascertainment units 70 to 75 shall be considered, which are supplied to the division unit 25. For this purpose, division unit 25 first checks whether the resulting internal torque requirement of the entire internal combustion engine 1 is smaller than or equal to the smallest upper limiting torque of all cylinder banks 5, 10. If this is the case, then division unit 25 divides the resulting internal torque requirement of internal combustion engine 1 into n individual internal torque requirements of equal magnitude of the individual cylinder banks 5 to 10. In this instance, the individual internal torque requirements of cylinder banks 5 to 10 correspond precisely to the resulting internal torque requirement of internal combustion engine 1. Thus, for example, if coordinator 20 demands as the resulting internal torque requirement of the entire internal combustion engine 1 a value of 200 Nm, and if the smallest upper limiting torque supplied to division unit 25 is =200 Nm or more, then division unit 25 forms for the n cylinder banks 5, 10 in each case one individual internal torque requirement of the respective cylinder bank in the magnitude of 200 Nm.

In the event, however, that division unit 25 determines that the resulting internal torque requirement of the internal combustion engine at the output of coordinator 20 is larger than the smallest upper limiting torque supplied by limiting torque ascertainment units 70 to 75, then division unit 25 divides the resulting internal torque requirement of internal combustion engine 1 at least for two of cylinder banks 5 to 10 into individual internal torque requirements of different magnitude of the associated cylinder banks. Particularly in this case it is advantageous if the division of the resulting internal torque requirement of internal combustion engine 1 into the individual internal torque requirements of the individual cylinder banks 5 to 10 occurs in the order of the magnitude of the upper limiting torques of cylinder banks 5 to 10, preferably starting with that cylinder bank with which the smallest upper limiting torque of all cylinder banks 5 to 10 is associated.

In the following, an algorithm is described in an exemplary fashion, with the aid of which the resulting internal torque requirement of internal combustion engine 1 can be divided into the individual internal torque requirements of the individual cylinder banks, this example being applicable both to the case in which division unit 25 determines that the resulting internal torque requirement of the internal combustion engine is smaller than or equal to the smallest upper limiting torque of all cylinder banks 5 to 10 as well as to the case in which the resulting output variable requirement of internal combustion engine 1 is larger than the smallest upper limiting torque of all cylinder banks 5 to 10.

In this algorithm, in a first step, a current change value ΔM for the individual internal torque requirements of the individual cylinder banks 5 to 10 is set to zero, and a cylinder bank is selected as the currently considered cylinder bank whose associated upper limiting torque is not undershot by any other cylinder bank. In a second step, the individual requirement of the currently considered cylinder bank is formed by a minimum selection from the upper limiting torque associated with the currently considered cylinder bank and the resulting internal torque requirement of internal combustion engine 1 plus the current change value for the individual internal torque requirements of the different cylinder banks divided by the number of the individual requirements yet to be formed. Following the complete processing of the algorithm, an individual internal torque requirement of the corresponding cylinder bank is to have been formed for each cylinder bank 5 to 10. The first step is executed by starting out from a situation in which no individual internal torque requirement has as yet been formed for any cylinder bank 5 to 10. A check is performed in a third step as to whether there exists a cylinder bank for which no individual internal torque requirement has as yet been formed. If this is the case, then a new current change value ΔM is formed for the individual internal torque requirements of the individual cylinder banks as the sum of the previous current change value for the individual internal torque requirements and the resulting internal torque requirement of internal combustion engine 1 minus the just formed individual requirement of the currently considered cylinder bank. Subsequently, a cylinder bank having the same or, if such does not exist, having the one larger upper limiting torque is selected as the new currently considered cylinder bank, and the second step is continued with this cylinder bank. Otherwise, if an individual internal torque requirement has already been formed for each of the cylinder banks, the division of the resulting internal torque requirement of internal combustion engine 1 into the individual internal torque requirements of the individual cylinder banks is terminated.

Figure 2:
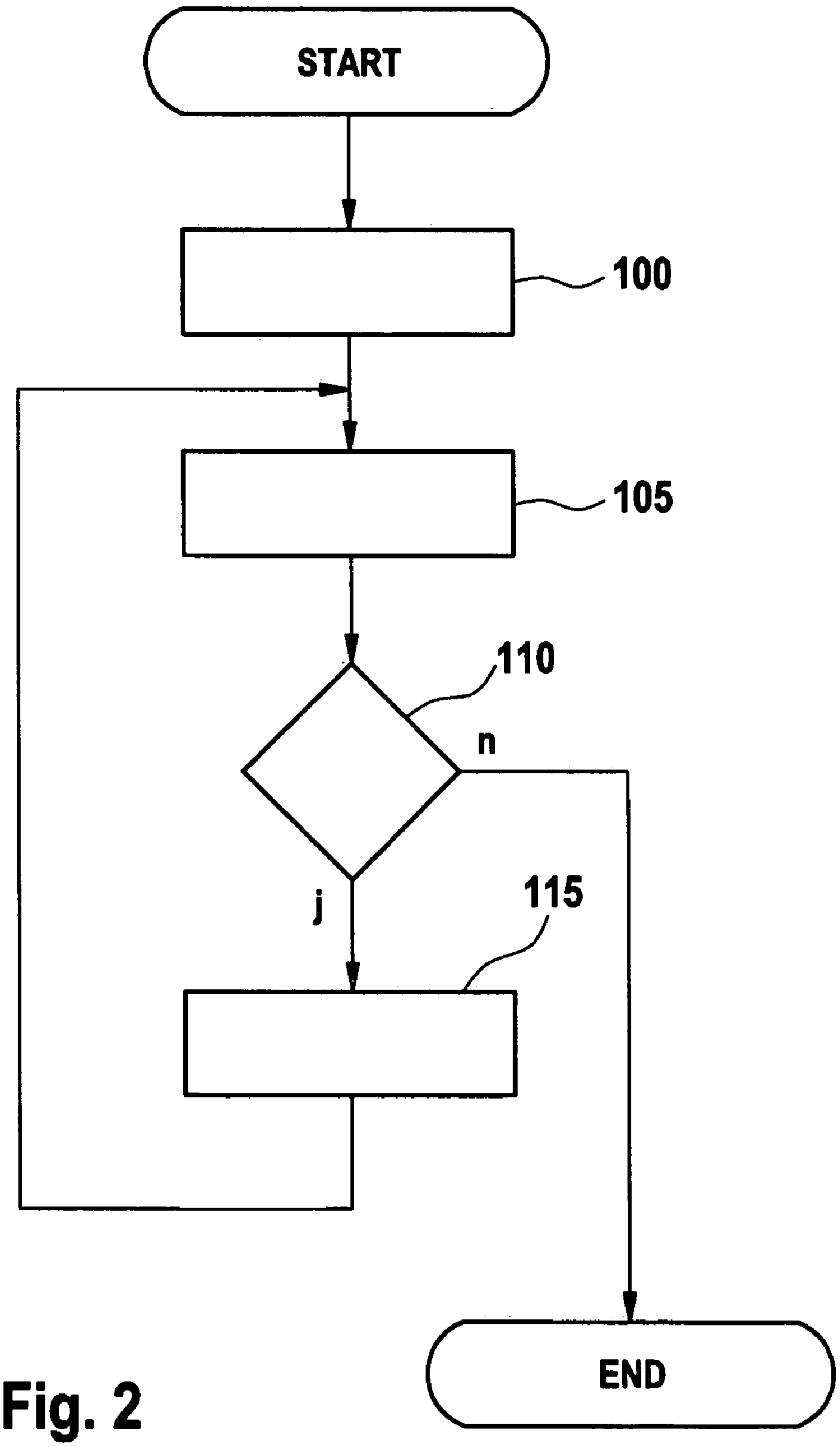
FIG. 2 shows a flow chart for a division of a resulting output variable requirement of the internal combustion engine into one or several individual output variable requirements of each particular cylinder bank of the internal combustion engine.

The described algorithm is represented by way of example in FIG. 2 with the aid of a flow chart. This flow chart is executed by division unit 25. Following the start of the program, the initial situation is as follows: No individual internal torque requirement of one of cylinder banks 5 to 10 has as yet been formed from the internal torque requirement of the internal combustion engine received by coordinator 20 in division unit 25.

At a program point 100, division unit 25 sets the current change value ΔM for the individual internal torque requirements of the individual cylinder banks 5 to 10 to the value zero, that is, ΔM=0, and selects from cylinder banks 5 to 10 one cylinder bank as the currently considered cylinder bank whose upper limiting torque is not undershot by the upper limiting torque of any other of cylinder banks 5 to 10. The program then branches to a program point 105.

At program point 105, for the currently considered cylinder bank, division unit 25 forms an associated individual internal torque requirement of this cylinder bank by minimum selection from the upper limiting torque associated with the currently observed cylinder bank and the resulting internal torque requirement M of internal combustion engine 1 plus the current change value for the individual internal torque requirement divided by the number of individual requirements yet to be formed. This occurs according to the following formula:

$$M_k = \mathrm{Min}\left(M + \frac{\Delta M}{n-(k-1)};\, M_{B,\mathrm{Max},k}\right) \tag{1}$$

In equation (1), $M_k$ represents the individual requirement of the currently considered cylinder bank. M is the resulting internal torque requirement of internal combustion engine 1. ΔM is, as described, the current change value for the individual internal torque requirements of the individual cylinder banks 5 to 10. n is the number of existing cylinder banks 5 to 10. $M_{B,Max,k}$ is the upper limiting torque associated with the currently considered cylinder bank. At program point 100, value k was set to the value 1, that is, k=1, by division unit 25. The value k was associated with the currently considered cylinder bank at program point 100. After program point 105, the program branches to a program point 110.

At program point 110, division unit 25 checks whether k<n. If this is the case, then the method branches to a program point 115, otherwise the program is terminated and thus the algorithm ended. At program point 115, the current change value ΔM for the individual internal torque requirements of the individual cylinder banks 5 to 10 is renewed, namely, as the sum of the previous current change value for the individual internal torque requirements of the individual cylinder banks 5 to 10 and the resulting internal torque requirement M of internal combustion engine 1 minus the individual requirement $M_k$ of the currently considered cylinder bank. The following equation is used for this purpose:

$$\Delta M = \Delta M + M - M_k \tag{2}$$

Subsequently, at program point 115, a cylinder bank having the same, or if such does not exist, having the one larger upper limiting torque is selected as the new currently considered cylinder bank, and the value k is incremented by one, that is, k=k+1. The new value for k is then associated with the new currently considered cylinder bank.

After program point 115, the program branches back to program point 105.

Figure 3:
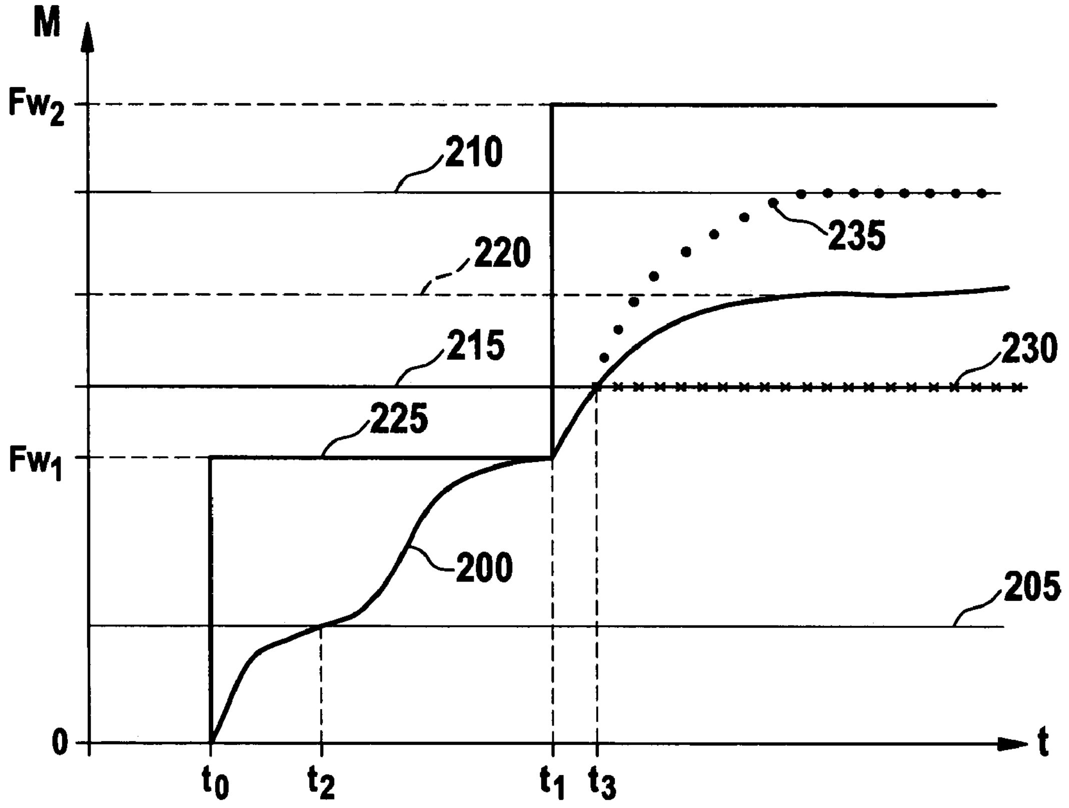
FIG. 3 shows a diagram of a torque characteristic over time to illustrate by way of example the mode of operation of the method according to the present invention and of the device according to the present invention.

FIG. 3 shows a time characteristic of the resulting internal torque requirement M of the internal combustion engine. Here it is assumed by way of example that internal combustion engine 1 comprises exactly two cylinder banks 5, 10. Reference numeral 225 in FIG. 3 indicates the time characteristic of a driver-desired torque supplied to the coordinator. A first upper limiting torque 210 is associated with first cylinder bank 5, which is larger than a second upper limiting torque 215 associated with second cylinder bank 10. The average of the two upper limiting torques 210, 215 formed by second averaging unit 55 is represented in FIG. 3 by reference numeral 220. As shown by characteristic 225, the driver-desired torque associated with the coordinator is equal to zero up to a first time to and at first time $t_0$ jumps to a first value FW1, which is smaller than the two upper limiting torques 210, 215 and hence also smaller than the average 220 of the upper limiting torques. The average torque loss of the two cylinder banks 5, 10 formed by first averaging unit 50 is also shown in FIG. 3 and is indicated by reference numeral 205. In this instance, the average torque loss lies between the value zero and the first value FW1 of the driver-desired torque. At a second time $t_1$ following the first time $t_0$, the driver-desired torque then jumps to a second value FW2, which is larger than the first upper limiting torque 210, than the second upper limiting torque 215 and than the average upper limiting torque 220. Furthermore, it is to be assumed that over the entire time period considered in FIG. 3 the driver-desired torque is formed by the coordinating element of coordinator 20 as a coordinated internal torque requirement of internal combustion engine 1. Up until second time $t_1$, the coordinated internal torque requirement of internal combustion engine 1 exists in the form of driver-desired torque 220 below the average upper limiting torque 220 and is therefore not limited in the limiting element of coordinator 20 following the coordinating element. Thus the driver-desired torque 225 is applied also at the output of the limiter of coordinator 20. The limiter in this instance is then still followed in coordinator 20, for example, by a driveability filter in a manner known to one skilled in the art, which filters the characteristic of the coordinated and possibly limited internal torque requirement of internal combustion engine 1 using a predefined time constant in order to effect an implementation of this coordinated and possibly limited internal torque requirement of internal combustion engine 1 that is as jerk-free and comfortable as possible. The time constant for this purpose may be applied, for example, on a test stand as a function of different operating states of internal combustion engine 1, it being possible for these operating states to differ particularly in that cylinder banks 5, 10 are operated at different or at identical individual internal torque requirements of the respective cylinder bank. According to the example shown in FIG. 3, the appropriately filtered, coordinated and possibly limited internal torque requirement of internal combustion engine 1 reaches the first value FW1 of the driver-desired torque at second time $t_1$. The filtered, coordinated and possibly limited internal torque requirement of internal combustion engine 1 corresponds to the resulting internal torque requirement of internal combustion engine 1 at the output of coordinator 20 and is the time characteristic indicated by reference numeral 200 in FIG. 3. The described time constant may be raised during the passage of the coordinated and possibly limited internal torque requirement of combustion engine 1 through the average torque loss value 205 in order to lower in quantitative terms the time gradient of the coordinated and possibly limited internal torque requirement of internal combustion engine 1. This is advantageous particularly because at the time at which the coordinated and possibly limited internal torque requirement of internal combustion engine 1 intersects the average torque loss value 205, a transition occurs from an overrun to an acceleration state or from an acceleration to an overrun state and this transition is to be as jerk-free and comfortable as possible. Thus FIG. 3 in exemplary fashion shows a transition from an overrun to an acceleration state at a third time $t_2$, at which the characteristic of the resulting internal torque requirement 200 of internal combustion engine 1 intersects the average torque loss value 205, and which lies between the first time $t_0$ and the second time $t_1$. As can be seen from FIG. 3, the time gradient of resulting internal torque requirement 200 of internal combustion engine 1 at third time $t_2$ is lowered in quantitative terms in comparison to the previous and the subsequent time characteristic of the resulting requirement 200.

As already described, up until second time $t_1$, the coordinated internal torque requirement of the internal combustion engine 1 is not limited by the limiter of coordinator 20 and therefore corresponds to driver-desired torque 225. At second time $t_1$, driver-desired torque 225 then jumps from first value FW1 to second value FW2 above average upper limiting torque 220. The result of this is that from second time $t_1$ on the coordinated internal torque requirement of internal combustion engine 1 in the form of driver-desired torque 225 is limited by the limiter of coordinator 20 to the average upper limiting torque value 220 supplied by second averaging unit 55 such that from second time $t_1$ on the driveability filter is supplied with average upper limiting torque 220 as the target value and no longer driver-desired torque 225. Thus, from time $t_1$ on, the characteristic of the resulting internal torque requirement 200 of internal combustion engine 1 follows the average upper limiting torque 220, which it approaches asymptotically. Up until a fourth time $t_3$, which follows the second time $t_1$, the resulting internal torque requirement 200 of the internal combustion engine 1 remains below the second upper limiting torque 215 as the smallest of the upper limiting torques of the two cylinder banks 5, 10. For this reason, division unit 25 up to the fourth time $t_3$ divides the resulting internal torque requirement 200 of the internal combustion engine 1 into individual internal torque requirements of equal magnitude of the two cylinder banks 5, 10. For first cylinder bank 5 this results in a first individual requirement placed on the internal torque to be generated by first cylinder bank 5, which corresponds to characteristic 200 in FIG. 3 up until the fourth time $t_3$. This furthermore results in a second individual internal torque requirement of the second cylinder bank 10, which up until fourth time $t_3$ likewise corresponds to the resulting internal torque requirement 200 of internal combustion engine 1 as shown in FIG. 3.

As soon as division unit 25, following the fourth time $t_3$, establishes that the resulting internal torque requirement 200 of internal combustion engine 1 exceeds the second upper limiting torque 215, it will limit, in accordance with the above-described flow chart shown in FIG. 2, the second individual internal torque requirement of second cylinder bank 10 to the second upper limiting torque 215, which is indicated in FIG. 3 by reference numeral 230 and the line marked by x's. For the first individual torque requirement of first cylinder bank 5 this then results in the characteristic represented by a dotted line in FIG. 3, which is also indicated by reference numeral 235 and which approaches the first upper limiting torque 210. Thus, in a steady state following the fourth time $t_3$, first cylinder bank 5 specifies and successively implements the first upper limiting torque value 210 as the internal torque and the second cylinder bank 10 the second upper limiting torque 215 such that internal combustion engine 1 on average again successively implements the average upper limiting torque 220.

For the purpose of an ecological and economical operation of internal combustion engine 1 it is desirable particularly in multi-cylinder engines to implement different operating modes in a cylinder bank-selective manner, i.e. to implement different operating modes by allowing for the existing cylinder banks to be used for different purposes and this in part even simultaneously. These different purposes, for example, may be a conventional spark-ignition or diesel combustion, a regeneration operation for regenerating, for example, an $NO_x$ storage catalyst or a particle filter, a homogeneous or partly homogeneous operation or a cylinder cutoff. The simultaneous variable operation of different cylinder banks of internal combustion engine 1 generally results in cylinder bank-specific variable charge-exchange losses and thus in cylinder bank-specific variable torque losses as described. Further it results in cylinder bank-specific variable torque limitations as described, for example for maintaining specified limiting values for the air-fuel mixture ratio. Further it also results in cylinder bank-specific variable rates of change of the torque limitations in large load changes.

If all cylinder banks 5 to 10 are operated simultaneously in the same operating mode or for the same purpose and in each case implement the same individual internal torque requirement, then the result will be a characteristic of the actual torque of internal combustion engine 1 that is periodic with respect to the ignition frequency. The ignition frequency in this instance results as the reciprocal value from the time interval between two successive ignitions of the internal combustion engine. In the event that at least two of the cylinder banks 5 to 10 are operated simultaneously but not in the same operating mode, that is, for example, simultaneously for various of the above-described purposes, then the resulting actual torque of internal combustion engine 1 is periodic with respect to the ignition frequency divided by the number of existing cylinder banks, that is, in the case of two cylinder banks, periodic with respect to half the ignition frequency. This means that, depending on the operating mode of the internal combustion engine, that is, depending on whether cylinder banks 5 to 10 of internal combustion engine 1 are operated simultaneously in the same operating mode or at least two of the cylinder banks are operated simultaneously in different operating modes, the torque requirements supplied by components 30, 35, 40, 45 and by first averaging unit 50 and the average upper and/or lower limiting torque value generated by second averaging unit 55 should be averaged over time over the above-described frequency resulting for the corresponding operation of the internal combustion engine in order to make the torque coordination for the corresponding operating state of internal combustion engine 1 reliable. The torque requirements supplied by components 30, 35, 40, 45 and first averaging unit 50 as well as the average upper and/or lower limiting torque supplied by second averaging unit 55 are thus averaged in their time characteristic resulting from the corresponding temporal sample values over the corresponding frequency.

The operation of the internal combustion engine is thus independent over whether the cylinder banks are operated simultaneously in the same mode or simultaneously in different modes such that the driver of the vehicle is unable to distinguish these two operating states of internal combustion engine 1. In this manner it is possible to implement the filter time constant of the driveability filter in the entire adjustable range of the internal torque of internal combustion engine 1 even when using the joint coordination of the internal torque requirements for multiple cylinder banks, and in particular it is possible to implement load-reversal damping, for example, as a formation around the average torque loss as shown in FIG. 3, and the setting range of an idle-speed controller as one of the components 30, 35, 40, 45, which supplies a torque requirement to coordinator 20, is able to achieve the maximum available internal torque of the internal combustion engine.

The average of the individual internal torque requirements to be implemented by cylinder banks 5 to 10 again corresponds to the resulting internal torque requirement of internal combustion engine 1 at the output of coordinator 20.

The present invention was described above by way of example for the case of an upper torque limitation. In a corresponding fashion, the method according to the present invention and the device according to the present invention may also be implemented for a torque limitation in the downward direction. In this case, the coordinated internal torque requirement of internal combustion engine 1 in coordinator 20 is limited by the limiter of coordinator 20, if indicated, to the average lower limiting torque received from second averaging unit 55. In this case, the resulting internal torque requirement of internal combustion engine 1 is divided into individual torque requirements of equal magnitude of the individual cylinder banks if the resulting internal torque requirement of internal combustion engine 1 is larger than or equal to the largest lower limiting torque of all cylinder banks, and otherwise the resulting internal torque requirement of internal combustion engine 1 is divided at least for two of the cylinder banks into individual internal torque requirements of different magnitude of the respective cylinder banks. In dividing the resulting internal torque requirements of internal combustion engine 1 into the individual internal torque requirements of the individual cylinder banks 5 to 10, one then proceeds, in a modification of the flow chart shown in FIG. 2, in reverse order, that is, starting from a current cylinder bank with which a lower limiting torque is associated that is not exceeded by any lower limiting torque of another cylinder bank. At program point 115, a cylinder bank having the same, or if such does not exist, having the one smaller lower limiting torque would then be selected as the new currently considered cylinder bank. Equation (1), which forms the basis at program point 105, is then to be modified such that $$M_k = \mathrm{Max}\left(M + \frac{\Delta M}{n-(k-1)};\ M_{B,\mathrm{Min},k}\right) \tag{3}$$

In this case, $M_{B,Min,k}$ is the lower limiting torque, which is associated with the currently considered cylinder bank. In this case instead of a minimum selection in accordance with the above specific embodiment there is a maximum selection. Furthermore, the above equation (2) in this second specific embodiment of the downward torque limitation in accordance with program point 115 is to be modified as follows:

$$\Delta M = \Delta M - M + M_k \tag{4}$$

In the event that both an average upper limiting torque value as well as an average lower limiting torque value are simultaneously supplied to coordinator 20 and corresponding upper limiting torque values and lower limiting torque values of the existing cylinder banks are simultaneously supplied to division unit 25, the division of the resulting internal torque requirement of the internal combustion engine may be performed either in accordance with the described algorithm for the upper torque limitation, which comprises equations (1) and (2), or using the algorithm for the lower torque limitation, which comprises equations (3) and (4), as long as the average lower limiting torque value is smaller than the average upper limiting torque value.

In the event that several cylinder banks are operated simultaneously in the same operating mode and in each case have to implement the same individual internal torque requirement simultaneously, these cylinder banks may also be jointly supplied with such an individual internal torque requirement for implementation. In this manner, this individual requirement may be implemented by a single implementation unit and yet by several cylinder banks simultaneously. Thus, for example, an individual requirement of 200 Nm may be implemented both by the first cylinder bank 5 as well as by the second cylinder bank 10 in the described example of the internal combustion engine having the two cylinder banks such that each of the two cylinder banks implements an internal torque of 200 Nm.

In the event that several cylinder banks have to implement different individual requirements, each of these different individual internal torque requirements may be definitely associated with one of these cylinder banks. Thus, for example, in the above-described example of the internal combustion engine having the exactly two cylinder banks 5, 10, the first individual requirement for the first cylinder bank 5 may require the implementation of a first torque of 200 Nm and the second individual internal torque requirement of the second cylinder bank 10 may require an implementation of an internal torque of 100 Nm. In this case it is advantageous if, as shown in FIG. 1, in each case one implementation unit is associated with each of these cylinder banks having the variable individual requirements to be implemented.

What is claimed is:

1. A device for operating an internal combustion engine including several cylinder banks, comprising:

a coordinator that forms a resulting requirement by coordinating several requirements placed on an output variable of the internal combustion engine, wherein:

the coordinator coordinates the requirements jointly for the several cylinder banks; and a division unit that divides the resulting output variable requirement into several individual output variable requirements of each particular cylinder bank.

2. The device as recited in claim 1, wherein the internal combustion engine is of a vehicle.

3. A method for operating an internal combustion engine including several cylinder banks, comprising:

forming a resulting requirement by coordinating several requirements placed on an output variable of the internal combustion engine;

performing the coordination of the requirements jointly for the several cylinder banks;

dividing a resulting output variable requirement into several individual output variable requirements of each particular cylinder bank.

4. The method as recited in claim 3, further comprising:

forming one of the requirements supplied to the coordination by an average of output variable losses of the several cylinder banks.

5. The method as recited in claim 3, further comprising:

forming one of the requirements supplied to the coordination by output variable losses of an entirety of the internal combustion engine.

6. The method as recited in claim 3, further comprising:

forming a limiting value for an output variable of the internal combustion engine supplied to the coordination by an average of one of an upper output variable limitation and a lower output variable limitation of the several cylinder banks.

7. The method as recited in claim 3, wherein the internal combustion engine is of a vehicle.

8. The method as recited in claim 3, wherein:

the dividing includes dividing the resulting output variable requirement of the internal combustion engine into the individual output variable requirements of each particular cylinder bank as a function of cylinder bank-specific output variable limitations.

9. The method as recited in claim 8, wherein:

the resulting output variable requirement is one of:

smaller than or equal to a smallest upper output variable limitation of all cylinder banks, and larger than or equal to a largest lower output variable limitation of all cylinder banks, and the resulting output variable requirement of the internal combustion engine is divided into individual output variable requirements of equal magnitude of each particular cylinder bank.

10. The method as recited in claim 8, wherein:

the resulting output variable requirement is one of:

larger than a smallest upper output variable limitation of all cylinder banks, and smaller than a largest lower output variable limitation of all cylinder banks, and the resulting output variable requirement of the internal combustion engine is divided into individual output variable requirements of different magnitude of each particular cylinder bank.

11. The method as recited in claim 8, wherein:

the resulting output variable requirement of the internal combustion engine is divided into individual output variable requirements of each particular cylinder bank in the order of the magnitude of one of an upper output variable limitation and a lower output variable limitation of the cylinder banks, beginning with that cylinder bank with which the smallest upper output variable limitation of all cylinder banks or with which the largest lower output variable limitation of all cylinder banks is associated.

12. The method as recited in claim 11, wherein:

in a first step a current change value for the individual requirements is set to zero and a currently considered cylinder bank is selected whose upper output variable limitation is not undershot by any other cylinder bank or whose lower output variable limitation is not exceeded by any other cylinder bank;

in a second step the individual requirement of the currently considered cylinder bank is formed by a minimum selection from the upper output variable limitation associated with the currently considered cylinder bank and the resulting output variable requirement of the internal combustion engine plus the current change value for the individual requirements divided by the number of the individual requirements yet to be formed or by a maximum selection from the lower output variable limitation associated with the currently considered cylinder bank and the resulting output variable requirement of the internal combustion engine plus the current change value for the individual requirements divided by the number of the individual requirements yet to be formed;

in a third step a check is performed to determine whether a cylinder bank exists for which no individual requirement has as yet been formed;

in this case a new current change value for the individual requirements is formed as the sum of the previous current change value for the individual requirements and the resulting output variable requirement of the internal combustion engine minus the individual requirement of the currently considered cylinder bank or as the sum of the previous current change value for the individual requirements and the individual requirement of the currently considered cylinder bank minus the resulting output variable requirement of the internal combustion engine;

as the new currently considered cylinder bank, a cylinder bank is selected having the same or, if such does not exist, having the one larger upper output variable limitation or a cylinder bank is selected having the same or, if such does not exist, having the one smaller lower output variable limitation and the second step is continued with this cylinder bank; and otherwise the division of the resulting output variable requirement of the internal combustion engine into the individual output variable requirements of each particular cylinder bank is broken off.

* * * * *